(12) United States Patent
Kwon

(10) Patent No.: US 6,499,782 B2
(45) Date of Patent: Dec. 31, 2002

(54) AUXILIARY HANDLE FIXTURE FOR MODULAR HEADLINE OF AUTOMOBILE

(75) Inventor: Hoe Hyun Kwon, Seoul (KR)

(73) Assignee: Daehan Solution Co., Ltd., Mandong (CN)

( * ) Notice: Subject to any disclaimer, the term of this patent is extended or adjusted under 35 U.S.C. 154(b) by 0 days.

(21) Appl. No.: 10/004,835

(22) Filed: Dec. 7, 2001

(65) Prior Publication Data

US 2002/0175529 A1 Nov. 28, 2002

(30) Foreign Application Priority Data

May 23, 2001 (KR) ............................................ 01-28378

(51) Int. Cl.$^7$ ............................................ B60R 19/00
(52) U.S. Cl. ...................... 296/1.1; 296/97.9; 296/214; 24/293; 24/295
(58) Field of Search ............................. 296/1.1, 97.09, 296/146.6, 39.1, 97.12, 214, 71; 280/751; 411/512, 908, 40, 508; 24/293, 295

(56) References Cited

U.S. PATENT DOCUMENTS

| | | | | |
|---|---|---|---|---|
| 2,199,347 A | * | 4/1940 | Roethel ........................ | 24/293 |
| 2,698,472 A | * | 1/1955 | Knohl .......................... | 24/295 |
| 3,310,929 A | * | 3/1967 | Garvey ........................ | 24/295 |
| 3,889,320 A | * | 6/1975 | Koscik ........................ | 411/501 |
| 4,043,579 A | * | 8/1977 | Meyer .......................... | 24/293 |
| 4,175,303 A | * | 11/1979 | Benedetti ...................... | 24/293 |
| 4,284,378 A | * | 8/1981 | Mizusawa ..................... | 411/40 |
| 4,407,618 A | * | 10/1983 | Kimura ........................ | 411/40 |
| 4,630,338 A | * | 12/1986 | Osterland et al. ............. | 24/293 |
| 4,902,068 A | * | 2/1990 | Dowd et al. .................. | 296/214 |
| 4,971,567 A | * | 11/1990 | Mizuno et al. ............... | 439/441 |
| 5,056,853 A | * | 10/1991 | Van Order .................. | 296/97.9 |
| 5,061,005 A | * | 10/1991 | Van Order et al. ......... | 296/97.9 |
| 5,186,517 A | * | 2/1993 | Gilmore et al. .............. | 296/214 |
| 5,201,564 A | * | 4/1993 | Price ........................ | 296/97.12 |
| 5,632,061 A | * | 5/1997 | Smith et al. ................ | 16/110.1 |
| 5,636,891 A | * | 6/1997 | Van Order et al. .......... | 296/214 |
| 5,662,375 A | * | 9/1997 | Adams et al. ............... | 296/214 |
| 5,752,853 A | * | 5/1998 | Curtindale .................. | 296/97.9 |
| 5,967,589 A | * | 10/1999 | Spadafora ................... | 296/97.9 |
| 5,975,617 A | * | 11/1999 | Jacquemin et al. ......... | 296/97.9 |
| 6,003,928 A | * | 12/1999 | Curtindale .................. | 296/97.9 |
| 6,015,126 A | * | 1/2000 | Murdock ..................... | 246/214 |
| 6,021,986 A | * | 2/2000 | Murdock ..................... | 296/97.9 |
| 6,231,109 B1 | * | 5/2001 | Beaver ........................ | 296/97.9 |
| 6,234,558 B1 | * | 5/2001 | Curtindale .................. | 296/97.9 |
| 6,324,732 B1 | * | 12/2001 | Arisaka et al. ............. | 296/97.9 |
| 6,336,672 B2 | * | 1/2002 | Beaver ........................ | 296/97.9 |
| 6,354,843 B1 | * | 3/2002 | Kato .......................... | 439/248 |
| 6,398,295 B2 | * | 6/2002 | Asai ........................... | 296/97.9 |
| 6,431,640 B1 | * | 8/2002 | Sakuma et al. .............. | 296/210 |
| 2002/0007537 A1 | * | 3/2001 | Lubera et al. ................ | 24/293 |
| 2002/0017799 A1 | * | 5/2001 | Asai et al. .................. | 296/97.9 |
| 2002/0089210 A1 | * | 7/2002 | Beaver | |

* cited by examiner

*Primary Examiner*—Kiran Patel
(74) *Attorney, Agent, or Firm*—Bacon & Thomas, PLLC

(57) ABSTRACT

The invention relates to an auxiliary-handle fixture for a modular headliner of an automobile, which enables an easy mounting and nevertheless guarantees a firm securement of accessaries.

The invention comprising a body 5 having a central threaded hole 48, a plurality of elastic coupling pieces 40 extending outwardly from the front portion of the body 5 in a spreading manner to the base portion of the body 5 and capable of contacting, with their ends, to the outer surface of the body panel 10 after insertion through the coupling hole 15, and a plurality of supporting pieces 45 bent at the base portion of the body 5 to extend outwardly toward the front portion of the body 5 to thereby elastically bear on the inside surface of the body panel 10 after mounting, wherein in assembling on the body panel 10, the ends of the coupling pieces 40 interfere with the outside surface of the body panel 10 for firm fixing and the end portions of the supporting pieces 45 elastically bear on the inner surface of the body panel 10 for prevention from play.

3 Claims, 5 Drawing Sheets

AUXILIARY HANDLE FIXTURE FOR MODULAR HEADLINE OF AUTOMOBILE

FIELD OF THE INVENTION

The present invention relates to an auxiliary-handle fixture for a modular headliner of an automobile, and more particularly to a new auxiliary-handle fixture for a module type headliner of an automobile which enables an easy mounting and nevertheless guarantees a firm securement of accessaries against loosening or detachment after mounting.

BACKGROUND OF THE INVENTION

Generally, a plurality of auxiliary handles are provided on upper positions of both sides inside an automobile for passengers to grip, wherein these handles are positioned inside the car, particularly at inner side of a headliner and fixed on a body panel through certain fixtures.

Conventionally, automobile manufactures installed the auxiliary handles on body panels one by one after attaching headliners on the inside of cars. Because this method adds to the burden of increasing assembling process for car manufactures, in recent years a modular method is employed, wherein when car manufacturers receive headliners already attached with the above-described auxiliary handles made by cooperating companies, the car manufacturers install them on body panels in a one-touch manner.

As a representative form of auxiliary-handle fixtures used in such a modular method is shown in FIGS. 1 and 2, those fixtures are formed of metal panels cut in predetermined form followed by bending, wherein in the base area, there are provided base portion 50 positioned between the body panel 10 and the headliner 20 and in the front or tip portion, there are provided hook portion 51 integrally bent from the base portion 50 and fitted in the holes 15 of the body panel 10. When the hooks 51, which are each provided, on respective opposite sides, with wedge-formed supporting pieces 53 spreading toward the base portion 50 from the tip portion, are inserted in the holes 15 of the body panel 10, the supporting pieces 53, in a compressed state, are coupled in the holes 15 of the body panel 10 and subsequently expanded by their own elasticity to engage with the body panel 10 for securement. As shown in Figures, however, in order to help the fixtures 5 coupled in the holes 15 of the body panel 10 to be secured and prevented from play, the supporting pieces 53 are provided, on the end parts, with bending portion 54, which are so formed as to be bent inwardly up to the free ends.

However, the fixtures of this type are associated with the problem that the supporting pieces 53 tend to experience a play as the bending portion 54 get flat or contracted, or even can come off the body panel 10 in extreme cases, when the auxiliary handles 30 connected to fixtures 5 are pulled, because the fixtures 5 are so secured that the bending portion 54 of supporting pieces 53 are tightly held against the inner circumferential surfaces of holes 15 in the body panel 10 but in a somewhat collapsable manner.

SUMMARY OF THE INVENTION

The present invention is intended to resolve the above-described problem and thus the object of the invention is to provide a new auxiliary-handle fixture for module type headliner of an automobile which enables an easy mounting and nevertheless guarantees a firm securement of the handle against loosening or detachment after mounting.

The above-described object is achieved according to an aspect of the invention by an auxiliary-handle fixture for a modular headliner of automobile, mounted in a coupling hole 15 of the body panel 10 for fixing an auxiliary handle 30 positioned inside a headliner 20, comprising a body 4 having a central threaded hole 48, a plurality of elastic coupling pieces 40 extending outwardly from the front portion of the body 4 in a spreading manner to the base portion of the body 4 and capable of contacting, with their ends, to the outer surface of the body panel 10 after insertion through the coupling hole 15, and a plurality of supporting pieces 45 bent at the base portion of the body 4 to extend outwardly toward the front portion of the body 4 to thereby elastically bear on the inside surface of the body panel 10 after mounting, wherein in assembling on the body panel 10, the ends of the coupling pieces 40 interfere with the outside surface of the body panel 10 for firm fixing and the end portions of the supporting pieces 45 elastically bear on the inner surface of the body panel 10 for prevention from play.

Preferably, the coupling pieces 40 and supporting pieces 45 are radially arranged around the central threaded hole 48 of the body 4 at predetermined circumferential angle and each pair of the coupling pieces 40 and supporting pieces 45 is arranged overlapped in view of the axial direction of the threaded hole 48.

Preferably, each pair of the coupling pieces 40 and supporting pieces 45 are disposed in opposite direction of the central threaded hole 48 of the body 4.

DETAILED DESCRIPTION OF THE INVENTION

A preferred embodiment of the present invention is described in detail below by referring to accompanying drawings.

Figures 1A, 1B:
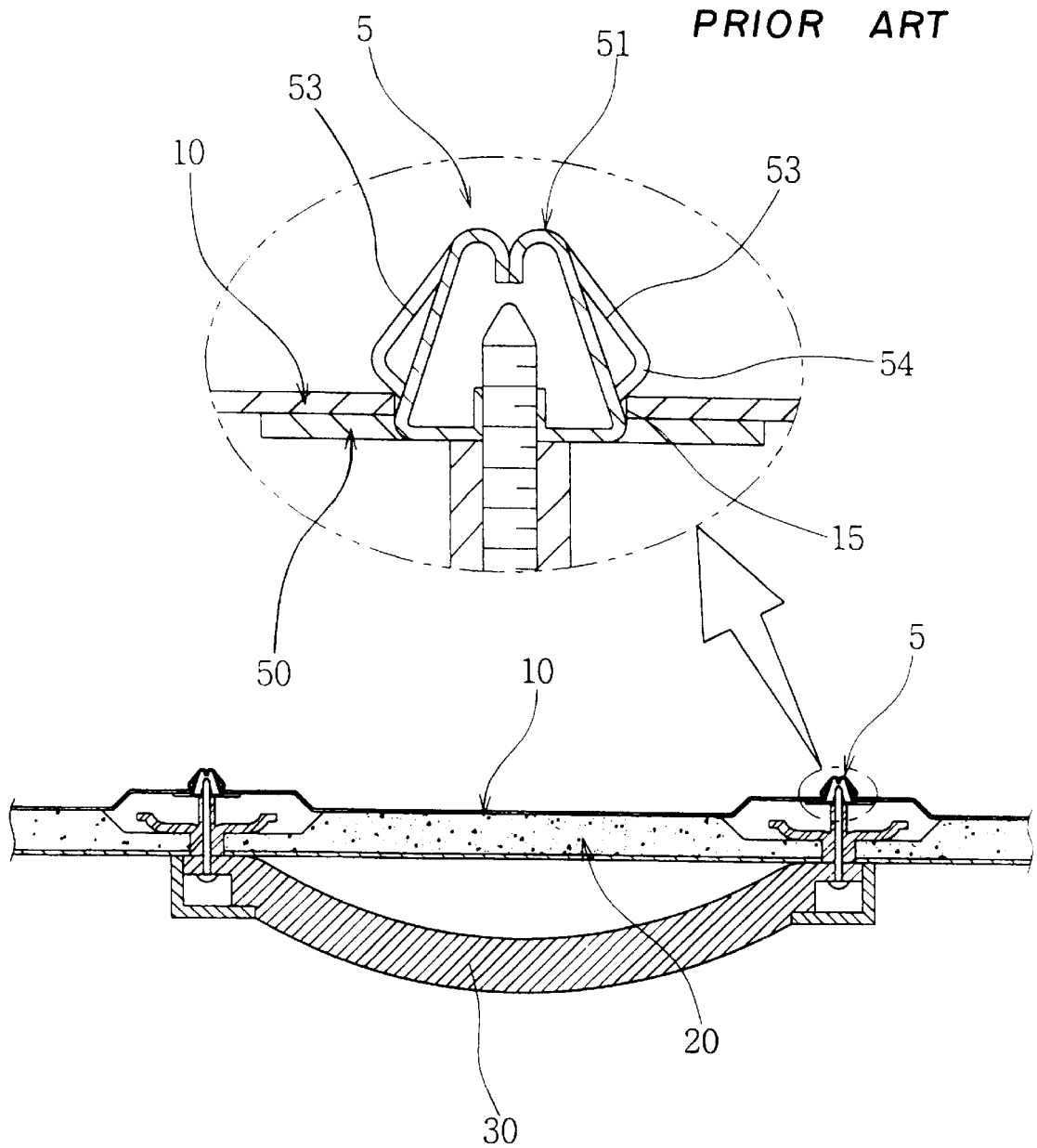
FIGS. 1(a) and (b) shows the cross section of the portion including an auxiliary handle for an automobile according to the conventional art.
Figure 2:
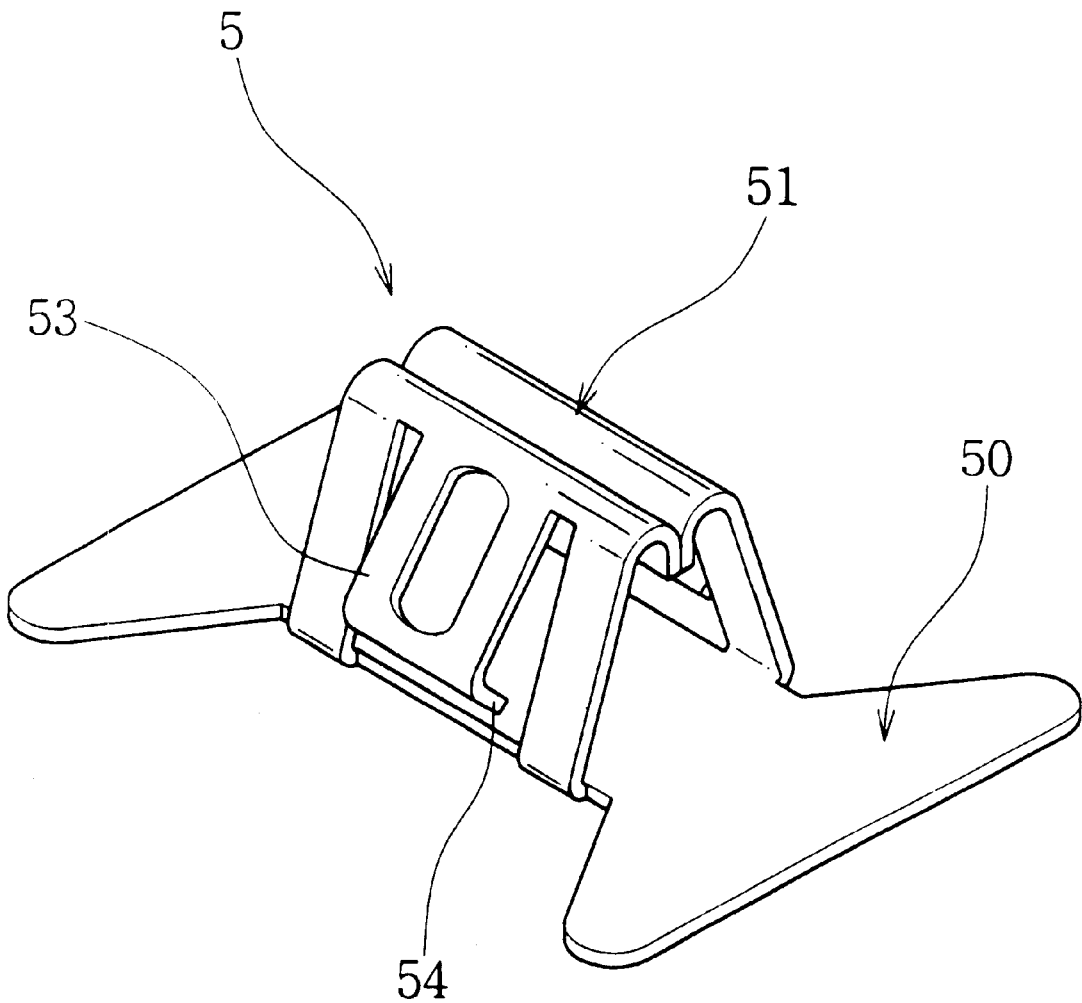
FIG. 2 shows the perspective view of a fixture for an auxiliary handle for an automobile according to the conventional art.
Figure 3:
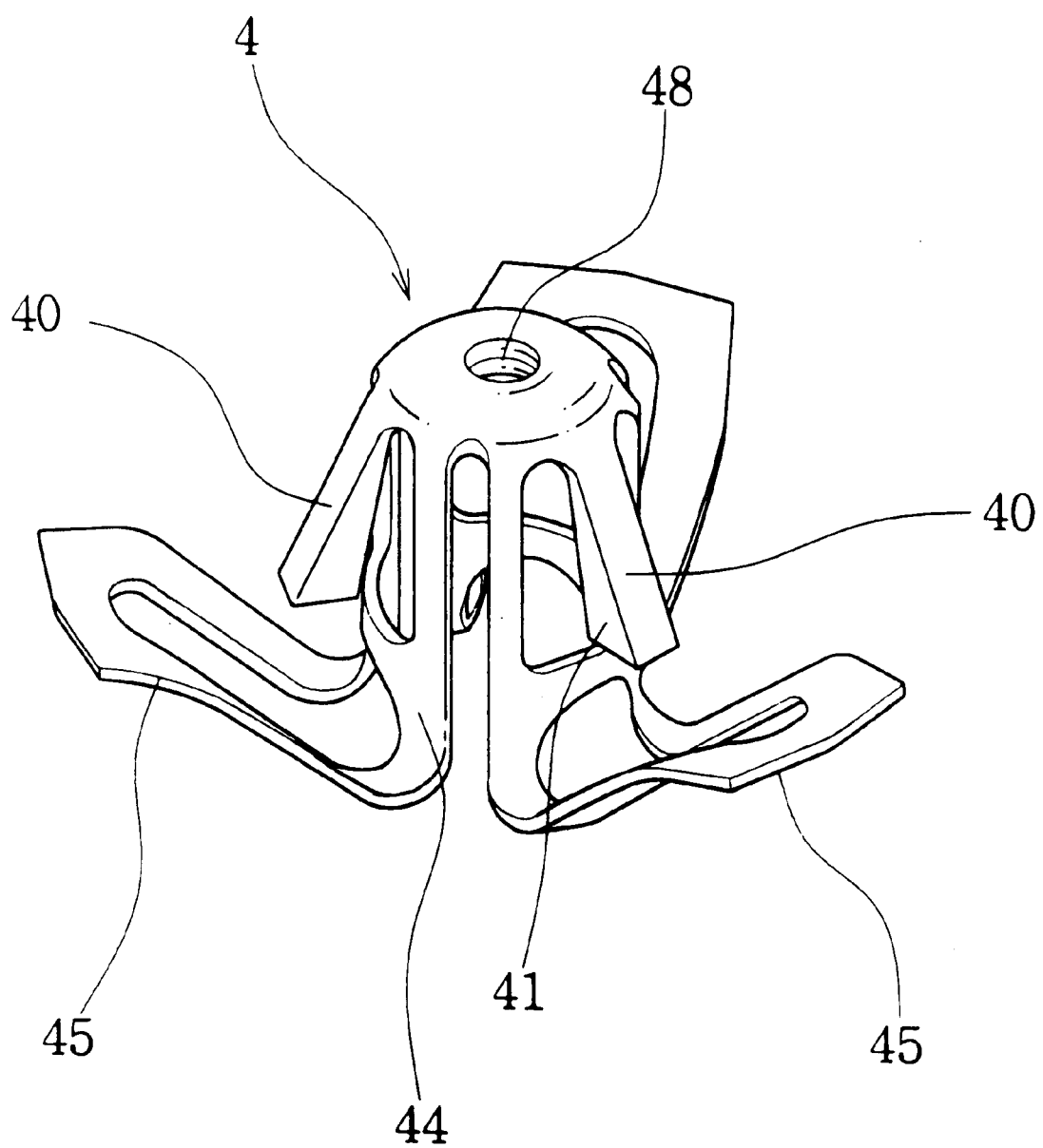
FIG. 3 shows the perspective view of the perspective view of a fixture for an auxiliary handle for an automobile according to the present invention and FIGS. 4(a) and (b) shows the cross section of the perspective view of a fixture for an auxiliary handle for an automobile according to the present invention, as in use.
Figure 4A:
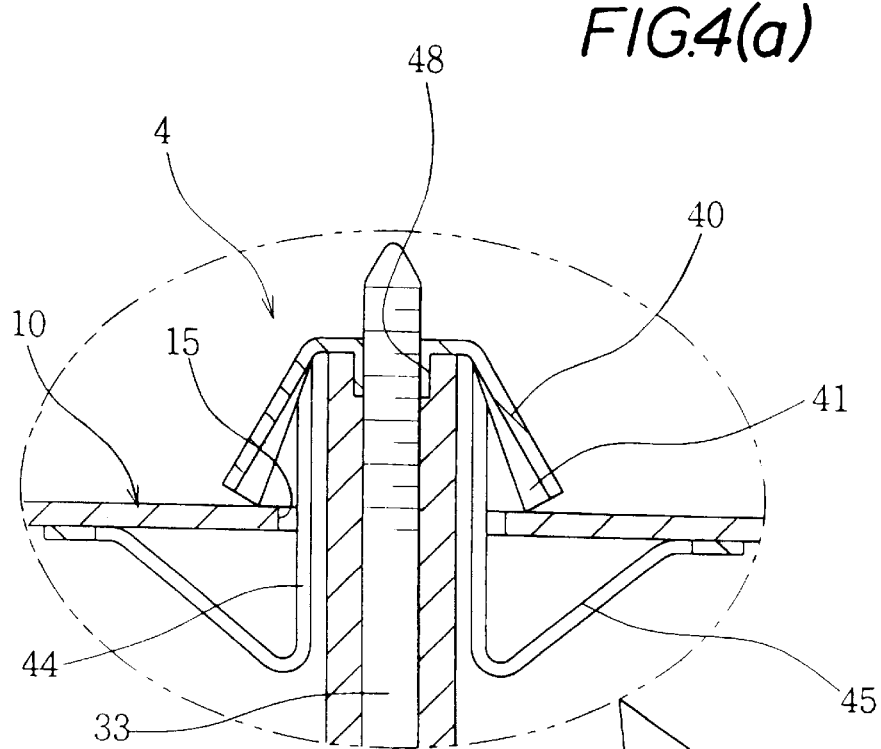
Figure 4B:
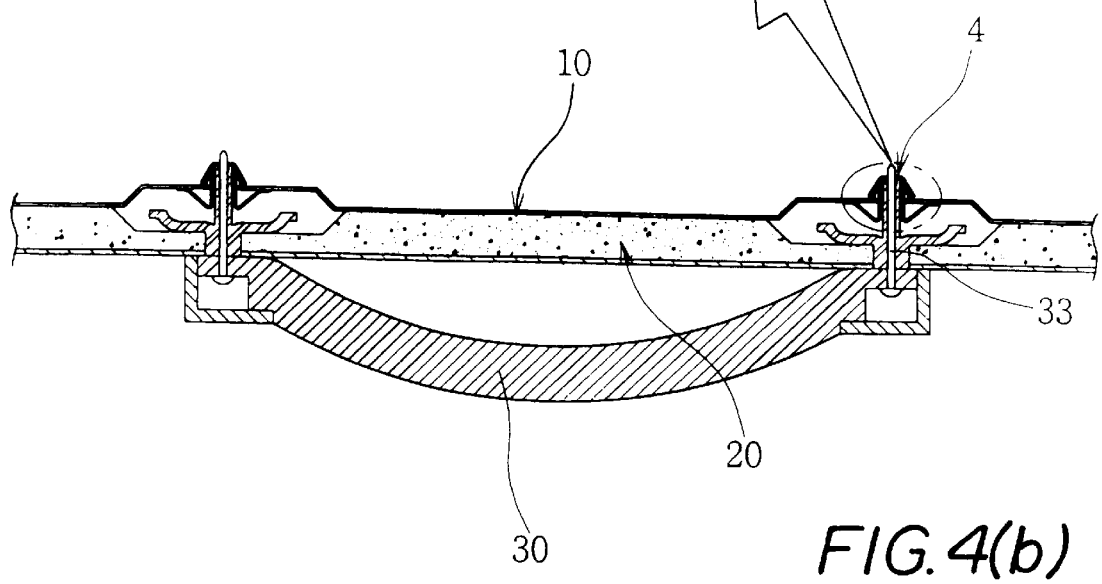

Referring to FIGS. 3 and 4, which show respectively a perspective and cross sectional views of an auxiliary-handle fixture in an automobile according to the invention, the auxiliary-handle fixture 30 for an automobile are provided with a body 4 having a central threaded hole 48, a plurality of elastic coupling pieces 40 extending outwardly and downwardly or toward the base portion of the body 4, wherein a plurality of supporting pieces 45 bent in the direction of outside tip are integrally formed in the base portion of the body 4.

The body 4, which is made by bending and forming a thin metal panel cut in the predetermined form, is formed with a threaded hole 48 on its front center of the body 4, around which three coupling pieces 40 in the front portion and three supporting pieces 45 in the base portion are formed radially at a respective interval of 120°. Specifically, each pair of respective coupling pieces 40 and supporting pieces 45 are so arranged that they are overlapped in view of the axial direction of the threaded hole 48. When the fixture of the invention is inserted into the coupling hole 15 of the body panel 10, they are respectively interfered with the outer and inner surfaces of the body panel 10 to thereby be fixed.

Further, the supporting pieces 45 are formed by the steps of bending a metal panel cut in the form of three-leaved clover around the threaded hole 48 to form a substantially cylindrical form and then bending the bent extensions 44 at about their central positions outwardly in radial direction. In addition, the bent extensions 44 are cut out from their front areas in a substantial U form to produce coupling pieces, which are bent to spread radially and outwardly toward the free ends, so that the coupling pieces 40 may result. Preferably, the coupling pieces 40 are formed, on radially inward side, with reinforcing profiles 41 to reinforce the coupling pieces against radial force acting thereon.

Accordingly, when a cooperating company supplies pre-assemblies which resulted by positioning auxiliary handles 30 inside the headliner 20 and screw-connecting the resulting assembly, through the threaded holes 48, to the body 4 positioned outside the headliner 20, the car manufacturer inserts the body 4 positioned outside the headliner 20 in the coupling holes 15 in the body panel 10 in one-touch method, so that the headliner 20 and auxiliary handles 30 may be simultaneously assembled to the body panel 10.

In this process, the plural coupling pieces 40 which normally extend from the front portion of the body 4 outwardly to the side of the base portion can be inserted through the coupling holes 15 by elastically compressing them in radially inward direction and after insertion, are elastically expanded radially with compressing force relieved to collide, with the free ends, against the outside surface of the body panel 10 for assured fixing.

On the other hand, the supporting pieces 45 which are provided on the base portion of body 4 so as to expand outwardly toward the front tip side are to contact the inside surface of the body panel 10 and maintain coupled state with more or less elastic deformation, once the coupling pieces 40 have passed the coupling holes 15.

Therefore, even when man jerks down an auxiliary handles 30, it does not fall off the hole 15 of body panel 10, because the downward movement of the coupling pieces 40 of the fixture 4 is engaged with the body panel 10. The coupling strength of the coupling pieces 40 with the body panel 10 is uniform to any directional force acting on, as they are arranged radially around the central threaded hole 48 at an equal spacing of 120°

Moreover, body 4 can be easily inserted through the coupling holes 15 of the body panel 10 in an assembling process, as the coupling pieces 40 in the base portion are elastically deformable. Further, when the coupling pieces 40 have completely fitted in coupling holes 15, the coupling pieces tend to expand radially outwardly due to their own elasticity, with the result that workers can detect imperfect couplings to prevent defective assembly.

In addition, the body 4 are further prevented from any play when mounted, as they are each provided, in their base portion, with supporting pieces 45 which bear elastically on the inside surface of the body panel 10. And, each pair of coupling pieces 40 and supporting pieces 45 is arranged overlapped in view of the axial direction of screw 33, so that twisting are prevented even in the case of high stresses in supporting pieces 45.

Figure 5:
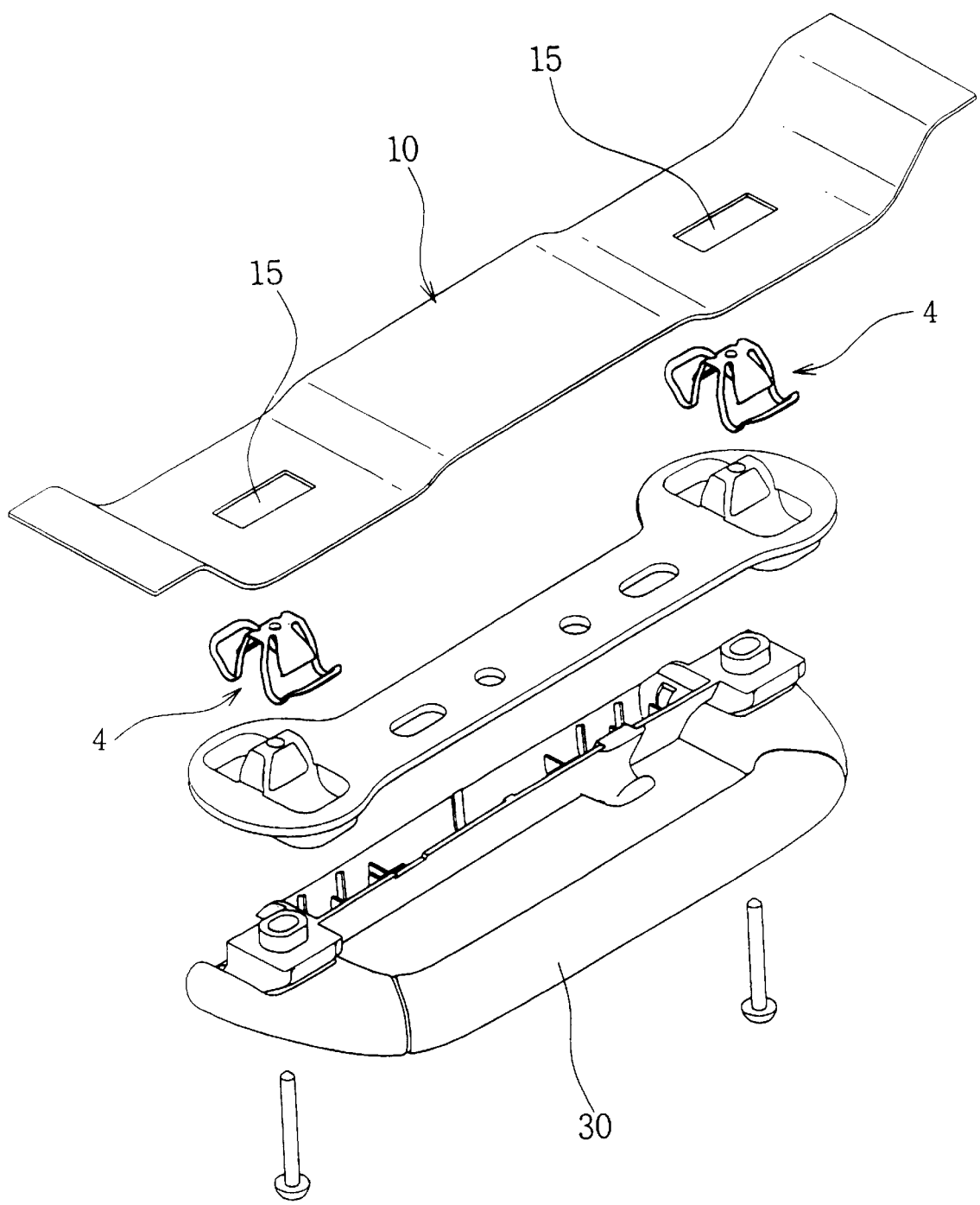
FIG. 5 shows another embodiment of the invention.

FIG. 5 shows another embodiment of the invention. where each pair of the coupling pieces 40 and supporting pieces 45 are disposed in opposite direction of the central threaded hole 48 of the body 5. And, the coupling hole 15 of body panel 10 have an elongated form. In this case, the fixture can be inserted and adjusted along the elongated coupling Holes 15 of the body panel 10. Therefore, the fixture can be easily assembled by adjusting the position of it along the elongated hole 15 of the body panel 10 even though there are some dimensional incorrectness of parts.

What is claimed is:

1. An auxiliary handle fixture for a modular headliner of automobile, mounted in a coupling hole 15 of the body panel 10 for fixing an auxiliary handle 30 positioned inside a headliner 20, comprising a body 5 having a central threaded hole 48, a plurality of elastic coupling pieces 40 extending outwardly from the front portion of the body 5 in a spreading manner to the base portion of the body 5 and capable of contacting, with their ends, to the outer surface of the body panel 10 after insertion through the coupling hole 15, and a plurality of supporting pieces 45 bent at the base portion of the body 5 to extend outwardly toward the front portion of the body 5 to thereby elastically bear on the inside surface of the body panel 10 after mounting, wherein in assembling on the body panel 10, the ends of the coupling pieces 40 interfere with the outside surface of the body panel 10 for firm fixing and the end portions of the supporting pieces 45 elastically bear on the inner surface of the body panel 10 for prevention from play.

2. An auxiliary handle fixture for a modular headliner of automobile of claim 1, wherein the coupling pieces 40 and supporting pieces 45 are radially arranged around the central threaded hole 48 of the body 5 at predetermined circumferential angle and each pair of the coupling pieces 40 and supporting pieces 45 is arranged overlapped in view of the axial direction of the threaded hole 48.

3. An auxiliary handle fixture for a modular headliner of automobile of claim 1, wherein each pair of the coupling pieces 40 and supporting pieces 45 are disposed in opposite direction of the central threaded hole 48 of the body 5.

* * * * *